(No Model.)
W. H. STANLY.
COMBINATION PLOW.
No. 351,133. Patented Oct. 19, 1886.
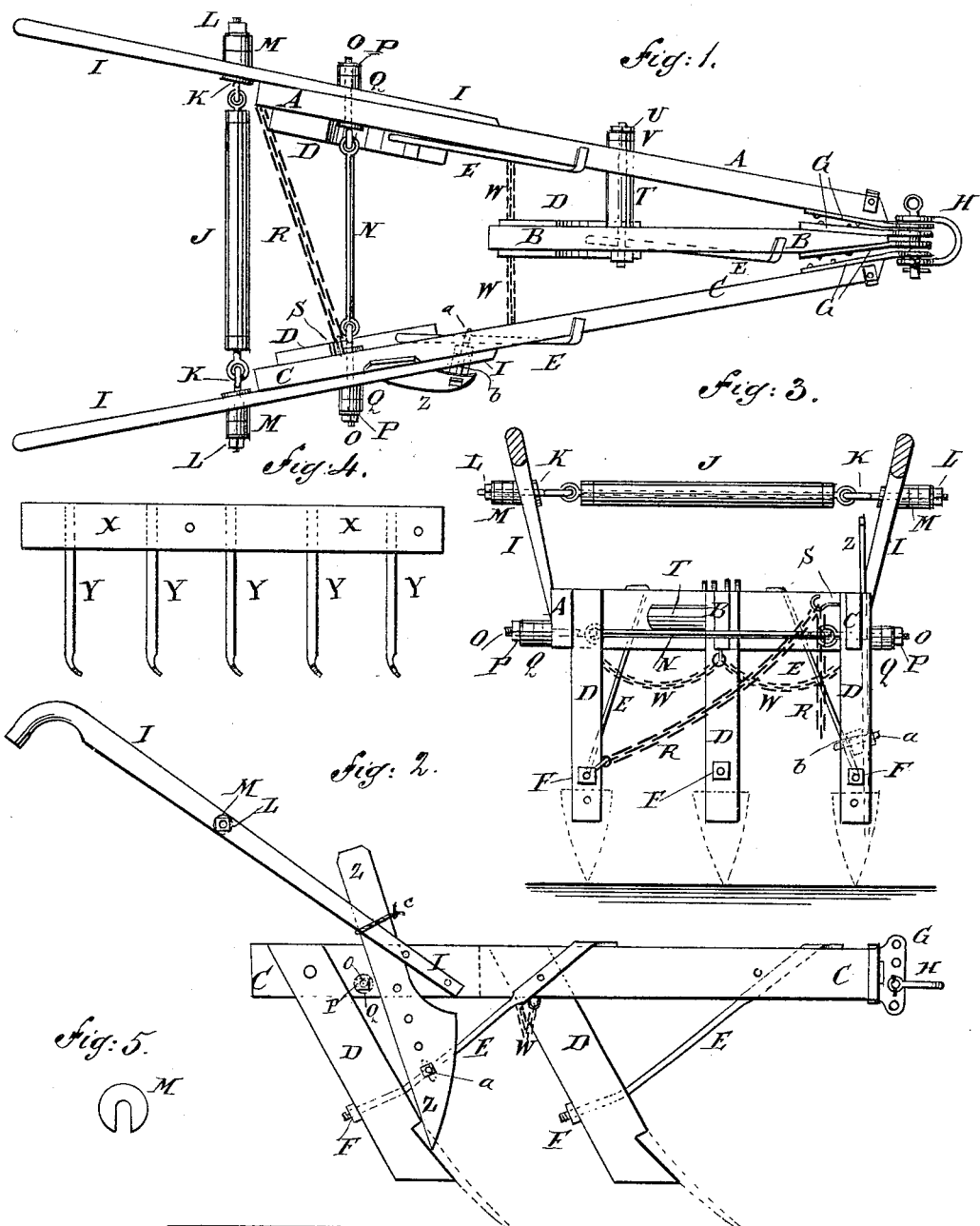
WITNESSES:
INVENTOR:
W. H. Stanly
BY Munn & Co
ATTORNEYS.

UNITED STATES PATENT OFFICE.

WILLIAM H. STANLY, OF QUITMAN, GEORGIA.

COMBINATION-PLOW.

SPECIFICATION forming part of Letters Patent No. 351,133, dated October 19, 1886.

Application filed June 23, 1886. Serial No. 206,003. (No model.)

*To all whom it may concern:*

Be it known that I, WILLIAM HADDOCK STANLY, of Quitman, in the county of Brooks and State of Georgia, have invented a new and useful Improvement in Combination-Plows, of which the following is a full, clear, and exact description.

Reference is to be had to the accompanying drawings, forming a part of this specification, in which similar letters of reference indicate corresponding parts in all the figures.

Figure 1 is a plan view of my improved plow. Fig. 2 is a side elevation of the same. Fig. 3 is a rear elevation of the same, the handles being shown in section. Fig. 4 is a side elevation of one of the harrow beams and its teeth. Fig. 5 is an elevation of one of the adjustable washers.

The object of this invention is to provide combination-plows constructed in such a manner that they can be readily adjusted for the different kinds of work required in preparing land to receive seed and in cultivating the plants.

The invention consists in the construction and combination of various parts of the combination-plow, as will be hereinafter fully described, and then claimed.

A B C are the plow-beams, the middle one, B, of which is a little more than half the length of the side beams, A C. To the rear ends of the beams A B C are bolted the upper ends of standards D, upon the lower ends of which are formed seats to receive the plow-plates, as indicated in dotted lines in Figs. 2 and 3. The draft-strain upon the standards D is sustained by the brace-rods E, the forward parts of which are bolted to the sides of the beams A B C, and their forward ends are bent laterally to rest and fit upon the upper edges of the said beams. The rear ends of the braces E pass through perforations in the standards D, and have nuts F screwed upon them, so that the pitch of the said standards can be regulated as the kind of plow-plate used may require by adjusting the said nuts F.

To the inner sides of the forward ends of the plow-beams A C, and to both sides of the forward end of the middle plow-beam, B, are bolted plates G, the forward ends of which project beyond the forward ends of the said plow-beams, are widened vertically, and have four (more or less) holes formed through them to receive the bolt of the draft-clevis H, so that by adjusting the said clevis H the point of draft attachment can be readily adjusted higher or lower to cause the plows to work deeper or shallower in the ground, as may be desired.

To the rear parts of the side beams, A C, are bolted the forward ends of the handles I, the middle parts of which are connected by a round or bar, J. To the ends of the bar J are hinged or otherwise jointed the ends of bolts K, which pass through holes in the handles I, and have nuts L screwed upon their outer ends. The bolts K are considerably longer than the thickness of the handles I, and have washers M placed upon them, which washers M can be placed upon the said bolts at the outer sides of the said handles, as shown in Figs. 1 and 3, or at their inner sides, according as the plows are to be adjusted wider apart or closer together. The washers M are slotted from their centers to their edges, as shown in Fig. 5, so that they can be changed from one side to the other of the handles I without taking out the bolts K.

The rear parts of the plow-beams A C are connected by a rod or bar, N, to the ends of which are jointed bolts O, passing through the said beams, having nuts P screwed upon their ends, and being provided with slotted washers Q in the same manner as the connecting-bar J, hereinbefore described. With this construction the plows of the beams A C can work upon a level with each other, or one can work at a higher level than the other, as may be required. The distance to which one of the plows can work below the other is gaged and limited by a chain R, one end of which is secured to the rear end of the brace-rod E of the plow-beam A, and its other end is secured by hooking a link of the said gage-chain upon a screw-hook, S, attached to the inner side of the rear part of the other plow-beam, C, as shown in Fig. 3. The rear end of the middle plow-beam, B, is secured to the plow-beam A by a bar, T, one end of which is secured to the said middle beam, B, and its other end, or a bolt formed upon or attached to the said other end, passes through the said plow-beam A, has a nut, U, screwed upon it, and is provided with slotted washers V, so that the said beam B can always be adjusted midway between the beams A C. When it is desired that the plow of the middle beam, B, should work at a different level from the beam A, the connecting-bar T is removed and the said beam B is kept in place by the chain W, the center of which is attached to the rear end of the said beam B, and its ends are attached to the side beams, A C, said chain being made of such a length as will allow the said beam B to have sufficient movement.

When desired, the plow-standards D and their braces E can be detached and the beams X bolted to the inner sides of the beams A C. The beams X are provided with harrow-teeth Y, formed of steel rods, having their lower ends flattened, widened, and curved forward, so that all the grass and weeds will be destroyed in the tracks of the parts of the harrow as it is drawn forward along a row of plants or between rows of plants, the jointed connections of the beams and handles allowing the said harrow to adjust itself to the surface of the ground.

The amount of soil thrown around the plants can be regulated by the fender Z, the lower part of which is made wide, and is tapered upon its forward edge in a curved line to its lower end. The fender has a number of holes formed through it to receive an eyebolt, $a$, through the eye of which passes the brace-rod E, and which is provided with a number of washers, $b$, so that the said fender can be readily raised and lowered or adjusted at a greater or less distance from the plows.

The upper part of the fender Z can be kept in place by being passed beneath the handle I, or by being secured to the said handle or to the beam C by a string, $c$, or other suitable means.

With this construction the plow can be readily adjusted as the work to be done may require—as, for instance, the standard of the middle beam, B, can be detached and the standard of the beam C moved forward, forming a double plow; or the beam C or the beams B C can be detached, forming a single plow; but in this case two handles should be attached to the rear end of the single beam. The plow thus constructed can be guided and controlled with as much ease as an ordinary single plow, whether the said plow be working upon level ground or upon ground planted in ridges.

Having thus fully described my invention, I claim as new and desire to secure by Letters Patent—

1. The combination, with the outer beams, A C, and the inner short beam, B, connected loosely at their forward ends, of a removable and adjustable bar, T, connecting beam B with beam A, a chain, W, connected at its outer ends to the outer beams, and at or near its middle to the rear end of the middle beam, B, whereby, by removing the bar T, the chains will limit the downward adjustment of the middle plow below the outer plows, substantially as set forth.

2. The combination, with the outer beams, A C, and short central beam, B, pivoted together at their forward ends and having handles, of the bar T, secured to beam B, and having a bolt at its outer end passed through beam A, the slotted washers and the nut on said bolt, the bars J N, connecting the beams and handles, respectively, and having bolts pivotally secured on their ends, as shown, slotted washers and nuts on said bolts, and a chain, R, connected to one beam and to the plow-standard of the opposite beam for limiting the depth one plow is to extend below the other, the connection-bars J N and their bolts allowing some vertical play to the beams, substantially as set forth.

WILLIAM H. STANLY.

Witnesses:
JOSEPH TILLMAN,
GEO. M. BADGER.